Patented Nov. 16, 1948

2,453,880

UNITED STATES PATENT OFFICE 2,453,880

CONTAINER

Byron M. Vanderbilt, Westfield, N. J., and Paul T. Parker, Baton Rouge, La., assignors to Standard Oil Development Company, a corporation of Delaware No Drawing. Application December 28, 1943, Serial No. 515,980

2 Claims. (Cl. 220—64)

1

This invention pertains to containers and particularly to containers for packaging tacky, rubber-like materials.

Packaging of rubbery organic materials such as high molecular weight polymers prepared by polymerization of isoolefins or mixtures of isoolefins with diolefins at temperatures below about −14° F. and in the presence of Friedel-Crafts type catalysts and also synthetic rubber-like polymers prepared by the emulsion polymerization of conjugated diolefins or mixtures of conjugated diolefins with copolymerizable compounds containing a single C=C linkage has been found to involve serious difficulties due to the extreme tackiness as well as the tendency toward cold flow possessed by these materials. At the present time these tacky polymers or copolymers are packaged and shipped in cartons which are coated with a mixture of a high molecular weight isoolefin polymer or isoolefin-diolefin copolymer with a surface active material such as kieselguhr, infusorial earth, magnesium silicate, zinc stearate, various pigment materials along with, if desired, a petroleum wax and the like. However, this coating has not proven to be very satisfactory due to its tendency to stick to the tacky, rubber-like polymers packaged therein. This is objectionable not only because the coating adheres to the polymer and eventually is incorporated therein during the subsequent working of the polymer, but also because of the fact that when the coating adheres to the packaged polymer and is mechanically separated from the carton as by rough handling under shipping conditions it leaves an unprotected surface in the carton to which the polymer adheres. A further disadvantage of this type of coating is that it is expensive to apply and involves a considerable fire hazard due to the naphtha or other inflammable solvents used for solubilizing the polymer in the coating.

It is the object of this invention to provide the art with containers bearing a coating which permits ready removal of tacky, rubbery organic materials from the container.

It is also the object of this invention to provide the art with containers bearing a coating that permits tacky, rubbery organic materials to be readily removed from the container, which coatings can be prepared without using inflammable solvents.

It is a further object of this invention to provide the art with containers which are both oil-proof and water-proof as well as non-adherent to tacky, rubbery organic materials.

2

It is also the object of this invention to provide the art with a method of coating containers which does not involve any fire hazard.

These and other objects will appear more clearly from the detailed description and claims which follow.

It has now been found that suitable coatings can be prepared which do not adhere to tacky, rubbery organic polymers but remain substantially unimpaired on the carton surfaces in contact with these polymers. These coatings comprise mixtures of a soap with suitable compatible waxes or like materials either alone or with a filler or the like, such as zinc stearate, zinc oxide, finely ground clays or other pigments and/or also with a binder consisting of a latex obtainable by the polymerization in aqueous emulsion of mixtures of butadiene or similar conjugated diolefins with acrylonitrile, methacrylonitrile and the like.

The coating compositions are advantageously prepared by emulsifying the wax in an aqueous soap solution at a temperature above the melting point of the wax followed by the incorporation, if desired, of a suitable pigment or filler and/or latex. The mixture is then vigorously agitated until it has cooled to a temperature substantially below the melting point of the wax.

The soaps used in our coating composition constitute at least about 25% of the final coating on a dry basis. It is essential, therefore, that the soaps used be substantially insoluble in hydrocarbon polymers. Soaps which may be used are ordinary commercial water-soluble, metal salt type soaps such as are prepared from tallow, coconut oil, soybean oil, lard and the like, although soaps prepared from other esters as well as from the fatty acids themselves such as stearic, palmitic, oleic acid and the like may be used. The soaps serve a dual function in our coatings, acting not only as an essential part of the finished coating, but also as an emulsifier in the preparation of the aqueous dispersion of coating ingredients. If so desired, small amounts of auxiliary emulsifying agents such as alkyl naphthalene sulfonates and the like may be used in addition to the soap.

Among the materials which may be mixed with soaps to form a protective coating on the interior of the containers are paraffin wax, candelilla wax, beeswax, carnauba wax, ozowax, montan wax, opal wax (a hydrogenated castor oil) and the like. Esters of $C_{12}$—$C_{18}$ and higher alcohols, triethanolamine esters of fatty acids such as stearic or palmitic acids, low molecular weight Glyptal resins obtainable by the condensation of polyhydric alcohols such as glycerine with dibasic acids such as phthalic acid, polystyrene, polyacrylonitrile, the polymer of ethylene oxide and condensation products from formaldehyde, phenols, amines and the like may be used in place of part or all of the wax.

The pigments or filler materials that may be incorporated in our coating compositions include zinc stearate, zinc oxide, finely ground clays, carbon black and water-insoluble soaps such as the calcium, barium, aluminum, magnesium and lead salts of fatty acids, sulfonated fatty acids, resin acids, etc.

The latex that may desirably be added in order to bind the coating more firmly to the container is prepared by the polymerization in aqueous emulsion of mixtures of butadiene or its homologues with nitriles of acrylic acid or alpha substituted acrylic acids such as methacrylic acid and the like as well as their halogen derivatives. The preferred latices are those obtained by polymerizing the diolefin and nitrile in substantially equal proportions. The latex may be prepared by emulsifying one part of a mixture consisting of at least 25% and preferably about 40-50% of a nitrile and a diolefin of the above types in from about 1½ to about 2½ parts of water using up to about 5% based on the water phase of a suitable surface-active agent such as a water-soluble soap, an alkyl naphthalene sulfonate or the like to assist emulsification. A polymerization catalyst such as hydrogen peroxide or an alkali metal or ammonium persulfate or perborate is added to the reaction mixture in amounts of up to about 1% based on the water phase. The reaction mixture is maintained under agitation and at a temperature of about 68° F. to about 122° F. for a period sufficient to effect the desired conversion. Generally, the reaction is continued until 70 to 80% conversion of the polymerizable materials is reached, this usually requiring from about 15-20 hours. Upon conclusion of the polymerization, the unreacted materials are flashed off and a stabilizer such as phenyl beta naphthylamine or the like is added.

The latex may be used in the form thus obtained or it may be subjected to vulcanization.

Vulcanization of the latex used in preparing our coating has some advantage over the use of the latex in unvulcanized form because it renders the diolefin-nitrile polymers still more insoluble in polymers such as polyisobutylene or isoolefin-diolefin low temperature copolymers. Vulcanization of the latex may be effected according to the following recipe:

| | Parts |
|---|---|
| Diolefin-nitrile copolymer (dry weight) | 100 |
| Zinc oxide | 5 |
| Sulfur | 1 |
| Ammonium alginate | 1.5 |
| Thiocarbamate type of accelerator | 1.2 |
| Sodium oleate soap | 1 |

These ingredients are simply mixed with the aqueous suspension of the latex. The time and temperature required for the vulcanization depend on the type of thiocarbamate accelerator which is used. One hour at 110° F. is often used but temperatures as low as room temperature are likewise satisfactory.

Under certain conditions, long exposure to relatively high temperatures, the coatings have a tendency to become flaky. This can be counteracted by adding about 5-10% (based on total solids) of a polyhydric alcohol such as glycerine, ethylene glycol, propylene glycol or the like to the aqueous dispersion. The polyhydric alcohol remains in the coating and acts as a plasticizer. It is also possible to utilize such polyhydric alcohols as the suspending medium and thereby avoid the use of water and the problem of drying the coating encountered when aqueous dispersions are used.

The coatings in accordance with the present invention are particularly applicable for lining cardboard cartons, although they may be applied as a coating for wrapping paper, for paper and cloth bags, for wooden and also metal or glass containers. The coating may be applied to the cardboard or other materials by brushing, spraying, dipping or by means of rolls. The coatings in accordance with the present invention are ordinarily applied at the rate of 2½-20 lbs. (dry basis) per thousand square feet of container surface. For low temperature isobutylene polymers and copolymers, a lower limit of about 5 lbs./1000 sq. ft. is preferred while with emulsion polymerizates such as butadiene-styrene emulsion copolymers the lower limit can be about 2½ lbs./1000 sq. ft. The containers carrying coatings in accordance with the present invention have proved quite applicable for packaging rubbery polymers and copolymers obtained by polymerizing isoolefins or mixtures of isoolefins with diolefins at temperatures below about −10° C. and in the presence of a Friedel-Crafts type catalyst as well as other rubber-like materials such as polybutadiene, polyisoprene, butadiene-styrene copolymers, isoprene-acrylonitrile copolymers and the like, as well as for certain waxes, resins, asphalts and the like which tend to adhere to ordinary cardboard, paper or metal containers.

The following examples are illustrative of the present invention but it will be understood that this invention is not limited thereto.

*Example 1*

To 40 pounds of water heated to a temperature of 190–200° F. is added 5 pounds of commercial soap. When solution is complete, 5 pounds of molten, candelilla wax is added with vigorous agitation. Agitation is continued until the mixture has cooled to about 125° F.

The resulting emulsion forms a soft paste-like mass which is readily applicable to cardboard surfaces. When dry, the coating is a smooth firm layer which possesses only a slight tendency to adhere to tacky polymers and will withstand repeated contacts with fresh polymer surfaces without serious damage to its efficacy as a protective coating. A particular advantage of this type of coating is that it can be applied without the use of inflammable solvents which introduce a fire and health hazard into the coating operation. This wax emulsion was found to spread evenly on cardboard and dried to give a sufficiently firm adherent coating. When commercial cardboard coated with a film of this material equivalent to 10 lbs./1000 sq. ft. and pressed against a solid, isobutylene-isoprene low temperature polymer under a pressure of .4 lb./sq. in., no adhesion occurred between the cardboard and the polymer after seven days at 110° F.

A cardboard carton capable of holding 50 pounds of this polymer was coated on the inside with this coating by brushing. The box was then filled with 50 pounds of this polymer having a Mooney viscosity of 50. The box was sealed and shipped by freight for a distance of approximately 1300 miles, placed in storage for approximately one week and then again shipped 1300 miles by express. Also included in this shipment was a carton of this polymer in which case the carton was coated with the usual zinc stearate-wax mixture. On examination of the two cartons after the 2600 mile shipment, the carton which had been lined with the candelilla wax-soap mixture was found to be in the more satisfactory condition. The walls of the carton were not stuck to the polymer and the polymer was easily removed from the box.

Similar results are obtained by varying the proportions of candelilla wax and soap from 75/25 parts to 25/75 parts.

*Example 2*

250 parts of water containing 24 parts of a commercial soap prepared from tallow were heated to 160° F. and 12 parts of molten paraffin wax (melting point 130° F.) were added while agitating. A smooth stable emulsion was formed. To the emulsion were then added 30 parts of finely divided zinc stearate. After stirring for approxately one-half hour, a stable slurry was obtained which did not separate after standing several days at ordinary temperature.

This coating composition was subjected to a "sandwich" test wherein a layer of the material to be packaged, in this case a low temperature isobutylene-isoprene copolymer, was placed between two sections of the packaging material which were coated with the above mixture. The size of the sandwich is 3 x 3″. Weights were placed on the cardboard to give the desired pressure of about 0.4 lbs./sq. in. The sandwich was then stored for about 100 hours in an oven at a temperature of about 100–120° F. The sample was then removed from the oven and examined for adhesion of the polymer to the packaging material. The cardboards coated with the above composition were found to be easily separable from the polymer.

*Example 3*

250 parts of water containing 24 parts of a commercial soap prepared from tallow were heated to 160° F. and 12 parts of molten paraffin wax (melting point 130° F.) were added while agitating. To the emulsion thus formed there were then added 30 parts of finely divided zinc stearate and 3 parts (dry weight) of an emulsion copolymerization of butadiene and acrylonitrile in latex form as a binder. After stirring for about one-half hour, a stable slurry was obtained which did not separate after standing for several days. Coatings prepared with this composition are more adherent to the cardboard and have less tendency to flake during handling than the composition of Example 2. When cardboard coated with this composition was subjected to the sandwich test described in Example 2, it was found that it did not adhere to the isobutylene-isoprene copolymer.

*Example 4*

A latex containing 25% of rubber solids was prepared by polymerizing a 50–50 mixture of butadiene and acrylonitrile in aqueous emulsion according to the procedure described above. This latex was then mixed with sufficient soap (Ivory) to give a mixture containing an equal weight of dry rubber and soap. The resultant composition is readily brushed onto cardboard or the like and the resultant coated cardboard was found to be easily separable from isobutylene-isoprene low temperature polymers as well as butadiene-styrene emulsion polymers as shown by the "sandwich" test.

*Example 5*

A test similar to that described in Example 4 was carried out except that acrylonitrile and butadiene were used in the ratio of 75 parts of the former to 25 parts of the latter and the resultant latex was mixed with an equal volume of a 2½% solution of sodium alginate. The resultant composition was tested as in the preceding examples with equally satisfactory results.

*Example 6*

30 parts of candelilla wax, 30 parts of a commercial tallow soap and 15 parts of glycerine were mixed and heated until miscibility was reached. The resultant molten mixture applied to cardboard gave a coating which permitted ready removal of polymer from a carton made with said cardboard.

The ratio in which the several components of the coating composition are used is variable and depends principally upon the particular materials used. In general, the amount of wax used should not be less than 6 weight per cent or more than about 24 weight per cent. The soap preferably constitutes at least 25 weight per cent of the composition. When using zinc stearate as the filler material, at least 12 parts of soap should be used for each 30 parts of zinc stearate and preferably the amount of soap should substantially equal the amount of filler.

The foregoing description contains a limited number of embodiments of our invention but it will be understood that our invention is not limited thereto since numerous variations are possible without departing from the scope of the following claims.

What we claim and desire to secure by Letters Patent is:

1. A coating composition comprising an aqueous dispersion of 24 parts of a water-soluble metal soap, 12 parts of a water insoluble wax, 30 parts of zinc stearate, and 3 parts of a copolymer of the composition consisting of butadiene and acrylonitrile, the latter being present in amounts between 25 and 75%.

2. A shipping and storage container comprising a base material and a coating on said base material, for non-adherent contact with the contents of the container, said coating comprising a dry residue of an aqueous dispersion of 24 parts of a water-soluble metal soap, 12 parts of a water insoluble wax, 30 parts of zinc stearate, and 3 parts of a copolymer of the composition consisting of butadiene and acrylonitrile, the latter being present in amounts between 25 and 75%, said soap constituting at least 25% of the solids in said coating.

BYRON M. VANDERBILT.
PAUL T. PARKER.

REFERENCES CITED

The following references are of record in the file of this patent:

UNITED STATES PATENTS

| Number | Name | Date |
| --- | --- | --- |
| 166,256 | Cable | Aug. 3, 1875 |
| 931,350 | Thoma | Aug. 17, 1909 |
| 1,367,274 | Miles | Feb. 1, 1921 |

(Other references on following page)

| Number | Name | Date |
|---|---|---|
| 2,043,897 | Levey | June 9, 1936 |
| 2,051,944 | Hershberger | Aug. 25, 1936 |
| 2,139,343 | Williams et al. | Dec. 6, 1938 |
| 2,201,537 | Hickler | May 21, 1940 |
| 2,216,362 | Wilson | Oct. 1, 1940 |
| 2,265,364 | Fowler et al. | Dec. 9, 1941 |
| 2,273,880 | Mitchell | Feb. 24, 1942 |
| 2,290,392 | Thomas | July 21, 1942 |
| 2,327,975 | Zaucker | Aug. 24, 1943 |
| 2,330,353 | Henderson | Sept. 28, 1943 |
| 2,333,887 | Redlinger | Nov. 9, 1943 |

OTHER REFERENCES

Rubber Chem. and Tech., vol. 10, pages 18 and 19 (1937).

"Hycar Synthetic Rubber Softener Study," volume 2, 1941, published by Hydrocarbon Chemical & Rubber Co., Akron, Ohio, pages 5, 18 and 19.